United States Patent [19]

Lopez

[11] 3,769,653
[45] Nov. 6, 1973

[54] CLIP FOR WINDSHIELD WIPER BLADE REFILL

[75] Inventor: Manuel Lopez, Trumbull, Conn.

[73] Assignee: The Roberk Company, Shelton, Conn.

[22] Filed: May 8, 1972

[21] Appl. No.: 250,968

[52] U.S. Cl. .......................................... 15/250.42
[51] Int. Cl. ............................................. B60s 1/38
[58] Field of Search .................... 15/250.36, 250.42

[56] References Cited
UNITED STATES PATENTS

| | | | |
|---|---|---|---|
| 2,782,447 | 2/1957 | Anderson | 15/250.42 |
| 2,983,945 | 5/1961 | DePew | 15/250.42 |
| 3,083,394 | 4/1963 | Scinta | 15/250.42 X |
| 3,233,273 | 2/1966 | Anderson | 15/250.42 |
| 3,626,544 | 12/1971 | Lopez et al. | 15/250.42 |

Primary Examiner—Peter Feldman
Attorney—Charles E. Temko

[57] ABSTRACT

A clip structure for use with a windshield wiper blade refill of the type disclosed in U.S. Pat. No. 3,626,544, in which provision is made for positive interconnection of the clip with the metal backing strips supporting the rubber wiper blade. Ease of installation and removal of the blade refill from the claws of the pressure-distributing super structure is facilitated by providing an improved resilient component on the latching means.

3 Claims, 6 Drawing Figures

PATENTED NOV 6 1973

3,769,653

CLIP FOR WINDSHIELD WIPER BLADE REFILL

This invention relates generally to the field of automotive windwhield wiper blades, and more particularly to an improved clip structure suitable for use in conjunction with a wiper blade refill of the type normally including the rubber blade component and a pair of flexible elongated metal supporting or backing members which serve to interconnect the rubber member to a plurality of claws forming a part of a pressure-distributing element, another portion of which interconnects with the free end of a wiper arm. Reference is made to U.S. Pat. No. 3,626,544, granted Dec. 14, 1971, the present disclosure relating to improvements thereover.

DISCUSSION OF THE PRIOR ART

Windshield wiper blade construction of this general type is disclosed in U.S. Pat. No. 2,649,605 wherein the wiping element may be selectively removed from the pressure-distributing super structure for purposes of replacement, normal attrition of the rubber components of the device necessitating such replacement after 12 to 14 months of service. It is known to provide a replaceable element including a rubber blade, and a pair of flexible elongated backing strips which engage corresponding grooves of the blade on inner edges thereof, and claws on the pressure-distributing means. The replacement operation consists of releasing a latching or retaining means on the original blade, sliding the backing strip from engagement with the claws, and inserting with a sliding motion the replacement unit. This is maintained against longitudinal movement either by the engagement of a latch with one of the claws, or the backing strip is provided with a clip on each end thereof, one of which is supplied in disengaged condition for installation on the trailing edge of the replacement unit after sliding engagement with the claw has been obtained. The latter construction permits of a degree of universality, in that relative movement in one direction is presented by engagement of one of the clips with one claw, and movement in the opposite direction by engagement of a second clip with a second claw. The former construction, while relatively simple to use, invariable provides a latch having a recess of width corresponding the width of the claw, thus preventing utilizing a structure of other than the same manufacturer. The latter construction does allow some longitudinal movement, and calls for considerable manual dexterity in engaging the clip means upon the backing strips to a degree not possessed by the average motorist, thereby making consumer installation difficult.

In U.S. Pat. No. 3,626,544, there is disclosed a structure which is relatively simple to use, and permits of accommodation with respect to a range of width sizes of claws. Unfortunately, this construction does not readily permit of positive interconnection of the clip with respect to the blade supporting members, and difficulty has been experienced in flexing the resilient leg members to a degree necessary to permit engagement and disengagement of the clip with the claw.

BRIEF DESCRIPTION OF THE PRESENT INVENTION

Briefly stated, the invention contemplates the provision of an improved clip of the type disclosed in U.S. Pat. No. 3,626,544, in which the main body member of the clip is provided with a pair of through openings which are alignable with corresponding openings in the end of the blade supporting members. The legs are supported on a resilient member interconnected with the main body member in such manner as to define an interstice affording ready access to the opening in the main body member whereby the clip may be secured to the ends of the blade supporting members by a staple in a manner similar to that employed at the opposite end of the blade refill. The mounting of the legs upon a resilient member the plane of which is substantially perpendicular to the plane of the main body member permits of an improved resilient action, and provides opposed surfaces which may be conveniently squeezed to easily flex the ends of the legs to a degree necessary for engagement and disengagement of the clip from a claw.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 3:
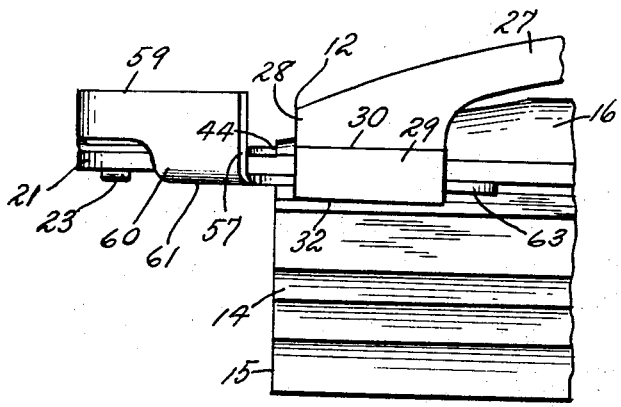
FIG. 3 is a fragmentary side elevational view thereof, showing the clip in operative engagement with a claw forming part of a pressure-distributing device.
Figure 4:
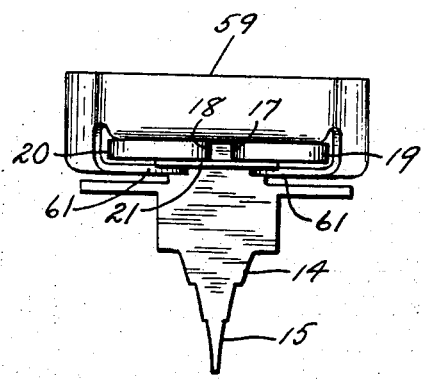
FIG. 4 is an end elevational view as seen from the left hand portion of FIG. 3.
Figure 5:
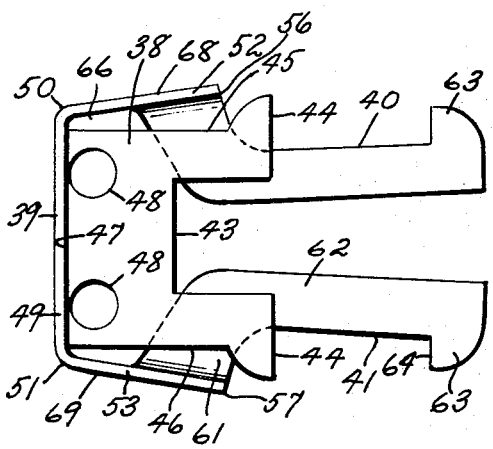
FIG. 5 is a top plan view of the clip in detached condition.
Figure 6:
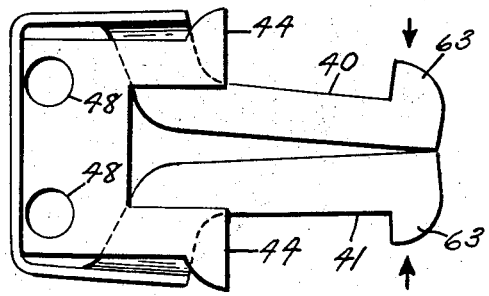
FIG. 6 is a bottom plan view of the clip in detached condition and showing compression of the resilient leg supporting means whereby certain of the component parts are placed in altered relative position.

In accordance with the invention, the device, generally indicated by reference character 10, is illustrated in the drawing in conjunction with a wiper blade refill element 11, and in FIG. 3 engaging a claw element 12 of a pressure-distributing means (not shown).

As is conventional in the art, the wiper blade refill element 11 includes a rubber wiper member 14 of conventional type, including a lower portion 15 and an upper portion 16 defining a pair of grooves 17 and 18 into which elongated flexible backing or supporting members 19 and 20 are fitted. The end portions 21 of the backing members are provided with openings 22 for engagement with means interconnecting the same to assure a retention of the blade member 14, as is known in the art. In the present construction, both ends (one of which is not shown) are interconnected by a wire staple 23.

The claw element may vary in detail, depending upon manufacture, and includes a body portion 27, and an end portion 28 which is modified to form a claw member 29. The member 29 includes a pair of upper laterally extending member portions, one of which is indicated by reference character 30, a pair of bridging portions, one of which is indicated by reference character 31, and a second pair of laterally extending portions, one of which is indicated by reference character 32, the members 31–32 defining interstices which slidably engage the outer edges of the members 19 and 20.

The device is preferably formed as a metallic stamping from relatively thin gauge stainless steel, and includes a main body member 38, a resilient leg supporting member 39, and first and second leg members 40 and 41, respectively.

The main body member 38 is of generally planar configuration, and includes a recess 43 for accommodating the end of the blade member 14. A free end edge 44 engages one side of the claw member 29, and extends to side edges 45 and 46. Adjacent the rear end edge 47, there are provided a pair of circular openings 48 positioned to permit the same to be aligned with openings in the members 19 and 20 for interconnection with the staple 23.

The leg supporting member 39 is interconnected at the edge 47 to the main body member 38 and includes a transversely extending wall 49, bend portions 50 and 51, and longitudinally extending walls 52 and 53. The lower edge of the wall 49 interconnects with the edge 47, and an upper edge 59 extends continuously over the portions 50–53, inclusive, to the terminal edges 56 and 57.

The leg members 40–41 are similar and symmetrically positioned, each including a connection portion 60, a curved portion 61 and elongated portions 62 extending to laterally extending terminals at 63. The terminal 63 include a shoulder-forming surfaces 64 which engage an opposite edge of the claw, the surfaces 64 being disposed in a plane beneath the plane of the main boby member 38 to allow a degree of longitudinal resiliency upon engagement of the clip with the claw.

Figure 1:
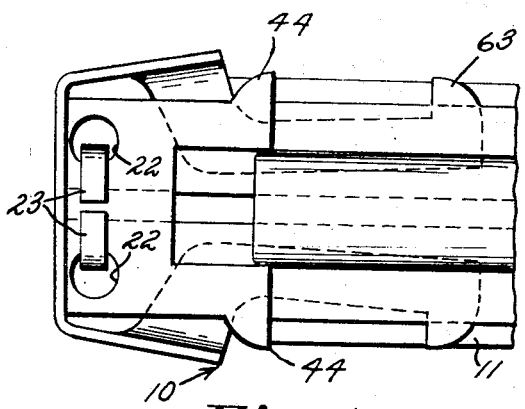
FIG. 1 is a fragmentary top plan view of an embodiment of the invention as mounted upon a wiper blade refill.
Figure 2:
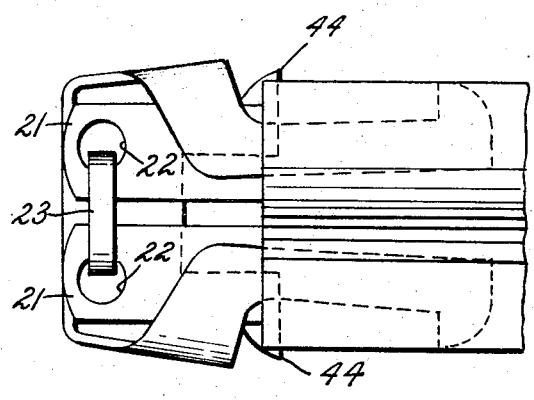
FIG. 2 is a fragmentary bottom plan view thereof.

As best seen in FIGS. 1 and 2, the configuration of the leg supporting member 39 and leg members 40 and 41 is such that an interstice, indicated by reference character 66, is provided which overlies the openings 48. Thus, during assembly, the staple 23 may be conveniently set interlocking the clip to the openings 67 in the backing members 19 and 20.

The disclosed construction also allows of a second adventage, in that pressure on the outwardly disposed surfaces 68 and 69 of the longitudinally extending walls 52 and 53 permits flexing of the bend portions 50–51 about an axis substantially perpendicular to the plane of the main body member 38, the spring modulous of this movement being considerably less than that encountered in the structure disclosed in U.S. Pat. No. 3,626,544 wherein a corresponding motion involves a substantial tortional movement, as distinguished from a simple bending in the present construction.

It is to be understood that it is not considered that the invention is limited to the precise details of structure shown and set forth in this specification, for obvious modifications will occur to those skilled in the art to which the invention pertains.

What is claimed is:

1. An integral clip for use with a windshield wiper blade refill comprising: a main body member, a resilient leg supporting member, and a pair of leg members; said main body member being of generally planar configuration, having principal axis and defining at least one free transversely extending edge; said leg supporting member including a transversely extending wall, the plane of which is substantially perpendicular to that of said main body member and having an edge interconnecting with said main body member, a pair of symmetrically disposed longitudinally extending walls resiliently interconnected at one end thereof to said transversely extending wall at either end of the latter for limited pivotal movement about an axis perpendicular to the plane of said main body member; said leg members being interconnected to oppositely disposed ends of said longitudinally extending walls, and lying in a plane in spaced and parallel relation beneath the plane of said main body member, said leg members having laterally opposed terminals disposed in spaced parallel relation relative to the free end edge of said main body member.

2. Structure in accordance with claim 1, said main body member having a pair of spaced through openings therein, said leg supporting members and leg members defining an interstice affording access to said openings.

3. Structure in accordance with claim 2 in combination with a pair of elongated flexible wiper blades supporting the members having openings at the end portions thereof corresponding in location to the openings in said main body member, and means in the form of a staple interconnecting said blade supporting members to said main body member.

* * * * *